(12) United States Patent
Orihara (10) Patent No.: US 10,579,268 B2
(45) Date of Patent: Mar. 3, 2020

(54) DISK CONTROL DEVICE, DISK CONTROL METHOD, AND RECORDING MEDIUM

(71) Applicant: NEC Corporation, Minato-ku, Tokyo (JP)

(72) Inventor: Naoshi Orihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/875,048

(22) Filed: Jan. 19, 2018

(65) Prior Publication Data

US 2018/0225043 A1    Aug. 9, 2018

(30) Foreign Application Priority Data

Feb. 7, 2017  (JP) .................................. 2017-019989

(51) Int. Cl.
| | |
|---|---|
| *G06F 12/00* | (2006.01) |
| *G06F 3/06* | (2006.01) |
| *G06F 12/0871* | (2016.01) |
| *G06F 9/455* | (2018.01) |
| *G06F 9/50* | (2006.01) |

(52) U.S. Cl.
CPC ............ *G06F 3/061* (2013.01); *G06F 3/0631* (2013.01); *G06F 3/0659* (2013.01); *G06F 3/0665* (2013.01); *G06F 3/0689* (2013.01); *G06F 9/45558* (2013.01); *G06F 9/5016* (2013.01); *G06F 12/0871* (2013.01); *G06F 2009/45579* (2013.01); *G06F 2009/45583* (2013.01); *G06F 2212/1021* (2013.01); *G06F 2212/152* (2013.01); *G06F 2212/263* (2013.01); *G06F 2212/284* (2013.01); *G06F 2212/314* (2013.01); *G06F 2212/502* (2013.01); *G06F 2212/6042* (2013.01)

(58) Field of Classification Search
None
See application file for complete search history.

(56) References Cited

U.S. PATENT DOCUMENTS

2012/0266177 A1\* 10/2012 Kakeda .................. G06F 3/061
                                                                            718/104
2017/0024322 A1\*  1/2017 Pan ..................... G06F 12/0862

FOREIGN PATENT DOCUMENTS

WO       2011/058821 A1      5/2011

\* cited by examiner

*Primary Examiner* — Barboucarr Faal (57) ABSTRACT

A disk control device includes a hypervisor, a cache access measurement unit, and a distribution determination unit. The cache access measurement unit measures a characteristic value of a logical disk by analyzing an access pattern to the logical disk by a cache memory. The distribution determination unit selects one of a plurality of virtual computers including the cache memory associated with the measured characteristic value. The hypervisor activates the virtual computer selected by the distribution determination unit and switches a forwarding destination of an input-output request to the logical disk to the virtual computer selected by the distribution determination unit.

8 Claims, 9 Drawing Sheets

DISK CONTROL DEVICE, DISK CONTROL METHOD, AND RECORDING MEDIUM

PRIORITY

This application is based upon and claims the benefit of priority from Japanese Patent Application No. 2017-019989, filed on Feb. 7, 2017, the disclosure of which is incorporated herein in its entirety by reference.

TECHNICAL FIELD

The present invention relates to a disk control device, a disk control method, and a recording medium and in particular, relates to a disk control device and the like, which performs input-output control suitable for an input-output characteristic of a logical disk.

BACKGROUND ART

Recently, a disk array device adopts technologies such as the many-core technology, the multi-thread technology, and the like and a high-performance CPU (Central Processing Unit) and a large-capacity memory are mounted thereon. Such disk array device intensively manages the logical disk to be for various use applications such as DB (Data Base) services, file management services, VOD (Video On Demand) services, and the like.

Because the logical disk has various use applications, there are various characteristics about an input-output pattern of the logical disk. By performing input-output control, resource allocation, or the like according to the characteristic of the logical disk, the input-output performance of the disk array device may be improved.

In International Publication No. 2011/058821, there is disclosed a storage system in which old and new storage programs can coexist by using a virtual machine.

However, when the disk array device performs the input-output control, the resource allocation, or another control that is suitable for the characteristic of a certain logical disk, the performance of another logical disk may be degraded. A specific example of such issue will be described below.

Figure 9:
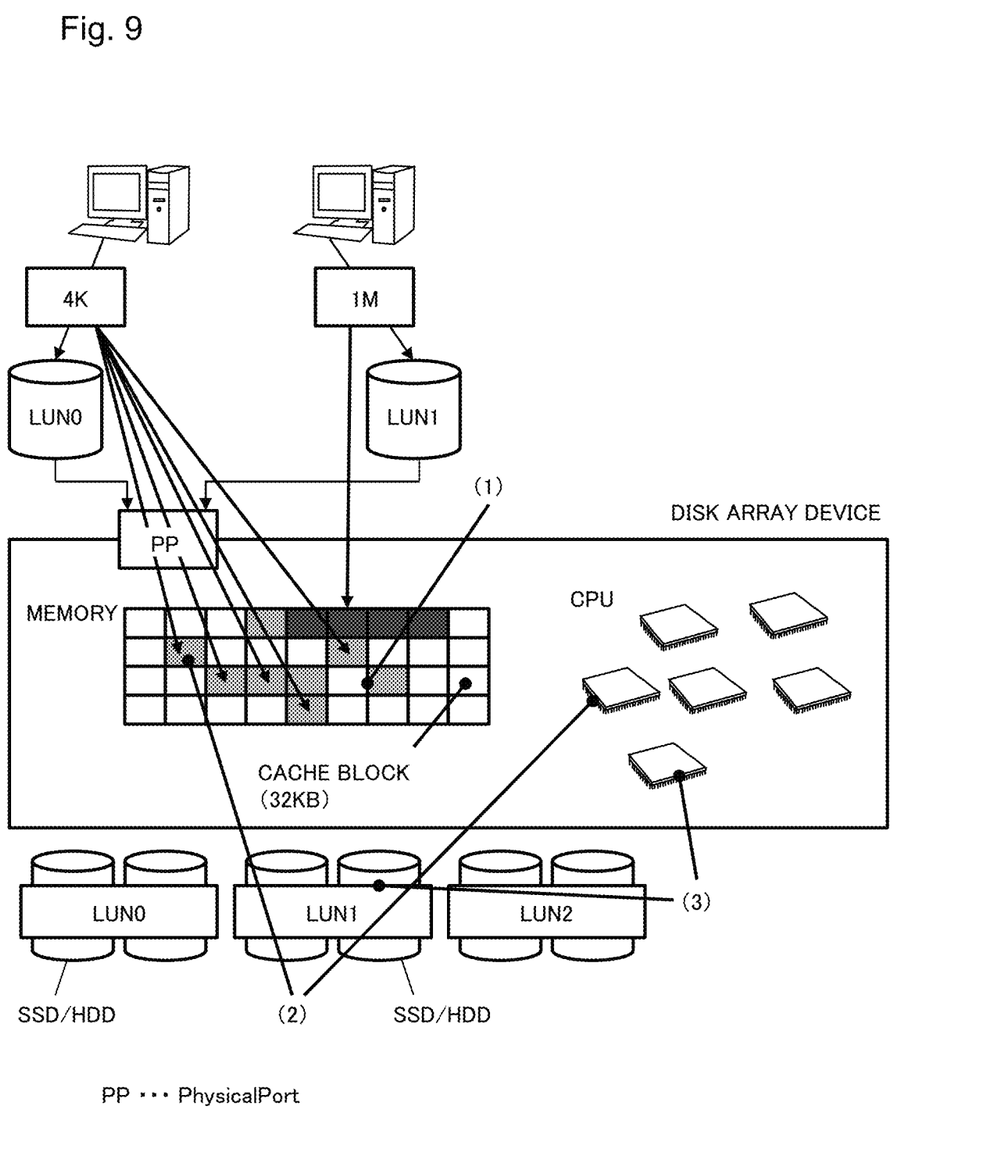
FIG. 9 is a figure showing a specific example for explaining a issue.

FIG. 9 is a figure showing a specific example for explaining an issue of the related technology. In this example, the disk array device controls a logical disk (LUN (logical unit number) 0) which issues random input-output whose multiplicity is large and whose transfer length is short and a logical disk (LUN1) which issues sequential input-output whose multiplicity is small and whose transfer length is long. An example of the logical disk (LUN0) is the logical disk used for the DB (Data Base) services. An example of the logical disk (LUN1) is the logical disk used for the VOD (Video On Demand) services. It is assumed that a total capacity of a memory block (cache block) secured by a cache memory of the disk array device is 32 KB (kilobytes). It is assumed that the transfer length of the logical disk (LUN0) is 4 kilobytes and the transfer length of the logical disk (LUN1) is 1 megabytes. In this condition, for example, there may be issues like followings.

1) Inefficient Memory Resource Management ((1) in FIG. 9)

As shown in FIG. 9, the logical disk (LUN1) requires an amount of memory larger than the logical disk (LUN0). However, in order to secure a large memory block required by the logical disk (LUN1), it is required to reallocate many small memory blocks of the cache memory. Accordingly, it is necessary to frequently perform a garbage process and a defragmentation process to the cache memory.

2) Excessive CPU Resource Occupancy ((2) in FIG. 9)

Because the transfer length of the logical disk (LUN0) is short, the logical disk (LUN0) can respond to a request in a relatively short time. Because the input-output is issued whenever the logical disk (LUN0) responds, a CPU consumption amount of the disk array device increases with the implementation of the process performed by the logical disk (LUN0). In an extreme case, the CPU performs only the process for the logical disk (LUN0), and an operation in which the CPU performs the process for the logical disk (LUN1) is hardly scheduled. As a result, the response of the logical disk (LUN1) is significantly delayed.

3) Input-Output Issuance Control That Is Not Suitable for the Characteristics of the Logical Disk ((3) in FIG. 9)

The characteristic of the logical disk is different for each type of the logical disk. A HDD (Hard Disk Drive) or a SSD (Solid State Drive) is an example of the type of the logical disk.

When the logical disk (LUN1) stores a certain amount of data in the cache memory and then writes the data in the logical disk, the performance of the logical disk (LUN1) can be elicited. Especially, in a case in which the logical disk is composed of the HDD, the logical disk (LUN1) can suppress seeking and elicit the performance of the disk array device by writing the data in the logical disk sequentially in address order on the basis of an elevator algorithm. Therefore, it is desirable that the logical disk (LUN1) stores the data on the memory block of the cache memory as much as possible. However, when the memory block of the cache memory is largely consumed by a load of the logical disk (LUN0), it becomes impossible the cache memory stores the data of the logical disk (LUN1) in the cache memory. As a result, the data of the logical disk (LUN1) is forced to be stored in the logical disk. In this case, the logical disk (LUN1) is required to issue an input output command many times and whereby, the process becomes inefficient.

On the other hand, in a case in which the logical disk (LUN1) is composed of the SSD, it is not necessary for the logical disk (LUN1) to store the data in the cache memory. This is because the SSD has a mechanism which can properly achieve random access.

In addition, when the block of the cache memory is largely consumed by the load of the logical disk (LUN0), a delay of the process related to a media error check executed by the disk control device may occur.

An object of the present invention is to provide a disk control device, a disk control method, and a recording medium recording a disk control program, which enable to suppress an input-output control in accordance with a characteristic of a certain logical disk from affecting another process, for example, causing performance degradation of another logical disk.

SUMMARY

An example aspect of the invention is a disk control device. The disk control device comprises a plurality of virtual computers and a virtual computer controller. The virtual computer controller is connected to a logical disk realized on a disk device. The virtual computer includes input-output unit including a cache memory that inputs and outputs data to and from the logical disk, cache access measurement unit for measuring a characteristic value of the logical disk by analyzing an access pattern to the logical disk by the cache memory, and distribution determination unit for selecting one of the plurality of virtual computers as an input-output execution virtual computer. The one of the plurality of the virtual computers includes the input-output unit that is suitable for the characteristic value. The virtual computer controller activates the input-output execution virtual computer selected by the distribution determination unit. When the virtual computer controller receives an input-output request to the logical disk, the virtual computer controller transfers the input-output request to the input-output execution virtual computer.

Another example aspect of the invention is a method for controlling operation of a disk control device. The disk control device includes a plurality of virtual computers and virtual computer controller. The virtual computer controller is connected to a logical disk realized on a disk device. The method comprises measuring a characteristic value of the logical disk by analyzing an access pattern to the logical disk by a cache memory of the virtual computer, selecting one of the plurality of virtual computers as an input-output execution virtual computer, the one of the plurality of virtual computers including input-output unit that is suitable for the characteristic value, activating a selected input-output execution virtual computer, and setting a forwarding destination of an input-output request to the logical disk to the input-output execution virtual computer, and when the virtual computer controller receive an input-output request to the logical disk, transferring the input-output request to the input-output execution virtual computer.

Another example aspect of the invention is a non-transitory recording medium recorded therein a program for controlling operation of a disk control device by a computer. The disk control device includes a plurality of virtual computers and virtual computer controller, the virtual computer controller is connected to a logical disk realized on the disk device. The program causes the computer to measure a characteristic value of the logical disk by analyzing an access pattern to the logical disk by a cache memory of the virtual computer, select, as an input-output execution virtual computer, one of the plurality of virtual computers including input-output unit that suitable for the characteristic value, activate a selected input-output execution virtual computer, and when the virtual computer controller receives an input-output request to the logical disk, transfer the input-output request to the logical disk to the input-output execution virtual computer.

BRIEF DESCRIPTION OF THE DRAWINGS

Exemplary features and advantages of the present invention will become apparent from the following detailed description when taken with the accompanying drawings in which.

EXAMPLE EMBODIMENT

First Example Embodiment

Overview

Figure 1:
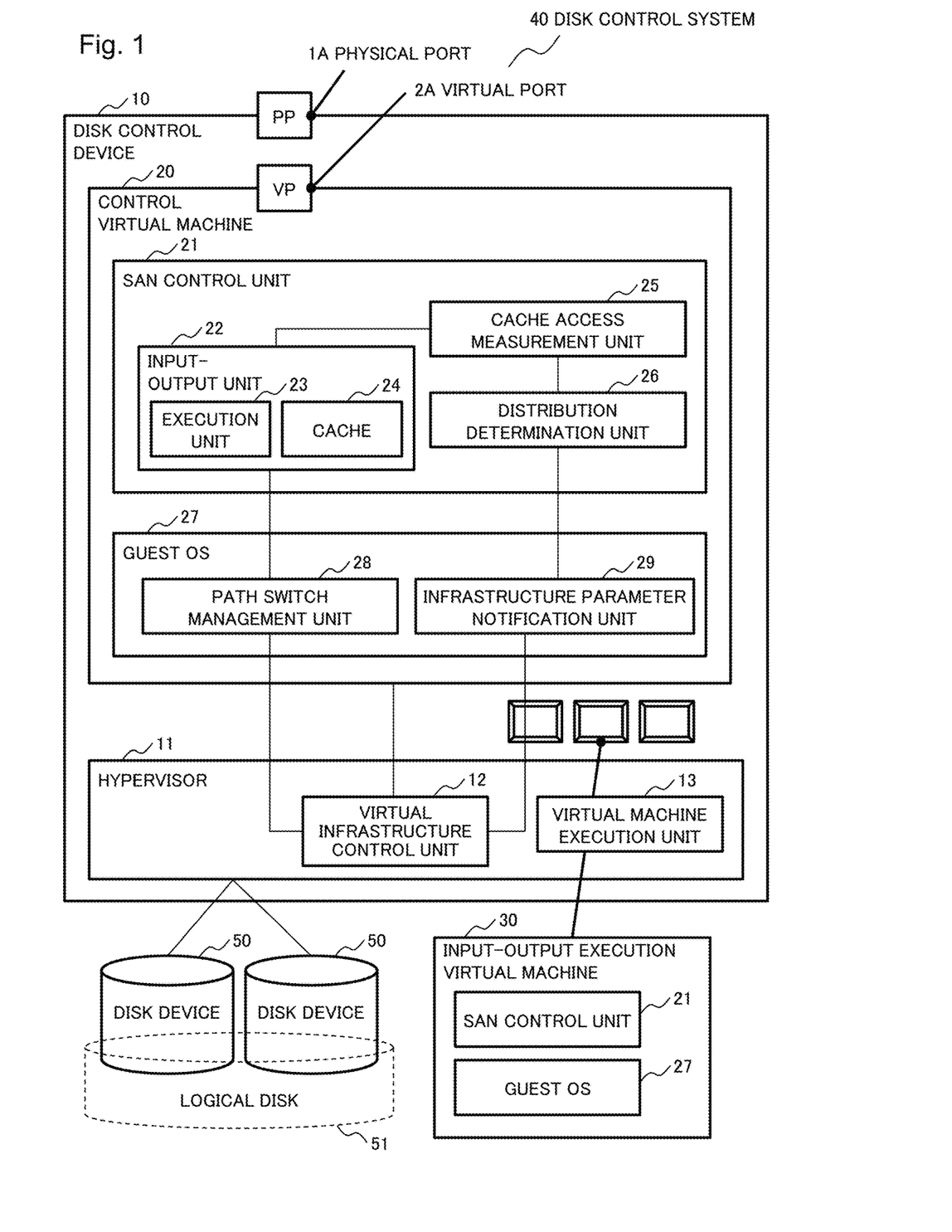
FIG. 1 is a figure illustrating a configuration of a disk control system 40 according to a first example embodiment of the present invention.

As shown in FIG. 1, a disk control system 40 includes a disk control device 10 includes a plurality of input-output execution virtual machines 30. An input-output unit 22 operates on the input-output execution virtual machine 30. The input-output unit 22 performs an input-output process according to a characteristic (for example, a characteristic I/O pattern or an operation pattern) of each logical disk 51. The input-output unit 22 is incorporated in a control virtual machine 20. The control virtual machine 20 and the plurality of input-output execution virtual machines 30 configure a plurality of virtual machines.

A cache access measurement unit 25 operates on a control virtual machine 20. The cache access measurement unit 25 calculates a characteristic value of the logical disk 51 relating to use of a cache 24 by analyzing an access pattern of the cache 24 to the logical disk 51. A distribution determination unit 26 selects one of the plurality of input-output execution virtual machines 30 on the basis of the characteristic value obtained as a result of analysis performed by the cache access measurement unit 25. Further, the distribution determination unit 26 allocates a resource to the selected input-output execution virtual machine 30 according to an input-output characteristic of the logical disk 51 and activates the input-output execution virtual machine 30.

Subsequently, a virtual infrastructure control unit 12 of a hypervisor 11 switches a path of an input-output request to the logical disk 51, which is received from an outside, from the control virtual machine 20 to the activated input-output execution virtual machine 30. The hypervisor 11 is an example of a virtual computer controller.

Configuration

FIG. 1 is a figure illustrating a configuration of a disk control system 40 according to the first example embodiment of the present invention. The disk control system 40 includes the disk control device 10 and disk devices 50 connected to the disk control device 10. The disk control device 10 receives the input-output request to the logical disk 51 from a higher-level device, for example, a general information processing device, via, for example, a physical port 1A.

The logical disk 51 is realized by one or more disk devices 50. For example, the logical disk 51 includes a plurality of disk devices 50 having a mirrored configuration. The logical disk 51 stores, for example, a file system and a database. Further, the disk device 50 may store data required for the execution of the process performed by the disk control device 10 in addition to the data of the logical disk 51.

The disk control device 10 includes the control virtual machine 20, a plurality of the input-output execution virtual machines 30, and the hypervisor 11.

The hypervisor 11 is an infrastructure of the control virtual machine 20 and the input-output execution virtual machine 30 and includes the virtual infrastructure control unit 12 and a virtual machine execution unit 13.

The virtual machine execution unit 13 allocates a required amount of resources (a memory, a CPU, and the like) to the input-output execution virtual machine 30 according to configuration definition information and activates the input-output execution virtual machine 30. The activated input-output execution virtual machine 30 performs input and output by using a designated guest OS 27 and a SAN (Storage Area Network) control unit 21.

The virtual infrastructure control unit 12 generates the configuration definition information of the input-output execution virtual machine 30 according to an instruction from an infrastructure parameter notification unit 29 of the control virtual machine 20. The configuration definition information includes information indicating an allocated memory amount, information indicating the number of allocated CPUs, and information designating the guest OS 27 or the SAN control unit 21 to be used.

Further, the virtual infrastructure control unit 12 performs switching of an input-output path. Namely, the virtual infrastructure control unit 12 selects the input-output execution virtual machine 30 to be used for processing the input-output request to the logical disk 51 that is received from the upper stream device. Further, the input-output request from the upper stream device is received by the physical port 1A of the disk control device 10 and delivered to the virtual infrastructure control unit 12 of the hypervisor 11. The virtual infrastructure control unit 12 transfers the input-output request to a virtual port (not shown) of the input-output execution virtual machine 30. The input-output request transferred to the input-output execution virtual machine 30 reaches an input-output unit (not shown) of the input-output execution virtual machine 30 from the virtual port (not shown) via the guest OS 27.

As shown in FIG. 1, the control virtual machine 20 includes the SAN control unit 21 and the guest OS 27.

The guest OS 27 includes the infrastructure parameter notification unit 29 and a path switch management unit 28 in addition to a usual OS function implementation part. The infrastructure parameter notification unit 29 notifies the virtual infrastructure control unit 12 of information from the SAN control unit 21 on the guest OS 27. For example, this information is the configuration definition information of the control virtual machine 20 and the input-output execution virtual machine 30 and is issued from the distribution determination unit 26. The path switch management unit 28 issues, to the virtual infrastructure control unit 12, an instruction to switch the path in such a way that the input-output execution virtual machine 30 can receive the input-output request, which has been received by the control virtual machine 20 and to be sent to the logical disk 51.

The SAN control unit 21 includes the input-output unit 22, the cache access measurement unit 25, and the distribution determination unit 26.

The input-output unit 22 includes an execution unit 23 and the cache 24. The execution unit 23 receives the input-output request to the logical disk 51 that is received from the upper stream device and performs input and output to the logical disk 51 by using the cache 24. The input-output unit 22 can perform input and output by using various control methods.

The input-output unit 22 included in the control virtual machine 20 performs input and output by using a predetermined control method. On the other hand, the input-output units (not shown) included in the plurality of the input-output execution virtual machines 30 perform input and output by using the control methods that are different for each input-output unit. In the following description, a reference mark "22" is also used for the input-output unit included in the SAN control unit 21 of the input-output execution virtual machine 30 like the input-output unit included in the SAN control unit 21 of the control virtual machine 20.

The cache access measurement unit 25 calculates the characteristic value of the logical disk 51. The cache access measurement unit 25 collects information of the characteristic value, for example, by measuring or acquiring the following information for each logical disk 51 as the characteristic value:

An occurrence rate of input-output queue in the input-output unit 22 or a frequency in use of the cache 24

An average/a standard deviation/a mode value of use size (that is, a total memory amount being requested) of the cache 24

A logical sector number requested by the input-output request

A contention rate of an identical memory block per unit time

A time interval of receiving input and output data from the upper stream device or the logical disk 51

The distribution determination unit 26 reads information of the collected characteristic value from the cache access measurement unit 25 and determines the way of usage of the logical disk 51 on the basis of the read information of the characteristic value. The distribution determination unit 26 determines which control method of the input-output unit 22 included in the input-output execution virtual machine 30 is to be selected based on the way of usage of the logical disk 51. The distribution determination unit 26 selects one input-output execution virtual machine 30 among the plurality of the input-output execution virtual machines 30 on the basis of a result of determination. Further, the distribution determination unit 26 determines resource allocation to the input-output execution virtual machine 30 according to the way of usage of the logical disk 51 and notifies the virtual infrastructure control unit 12 and the virtual machine execution unit 13 of the completion of the selection and determination process.

The plurality of the input-output execution virtual machines 30 include the input-output unit 22 which performs input and output by using the control method that is different for each input-output unit 22. The input-output unit 22 included in each input-output execution virtual machines 30 may be included in the SAN control unit 21. The virtual machine execution unit 13 may create the input-output execution virtual machine 30 by using the configuration definition information and activate it.

Here, the SAN control unit 21 (including an internal element other than the cache 24) of the disk control device 10 is composed of a logic circuit or a dedicated PU (Processing Unit) and firmware.

Figure 2:
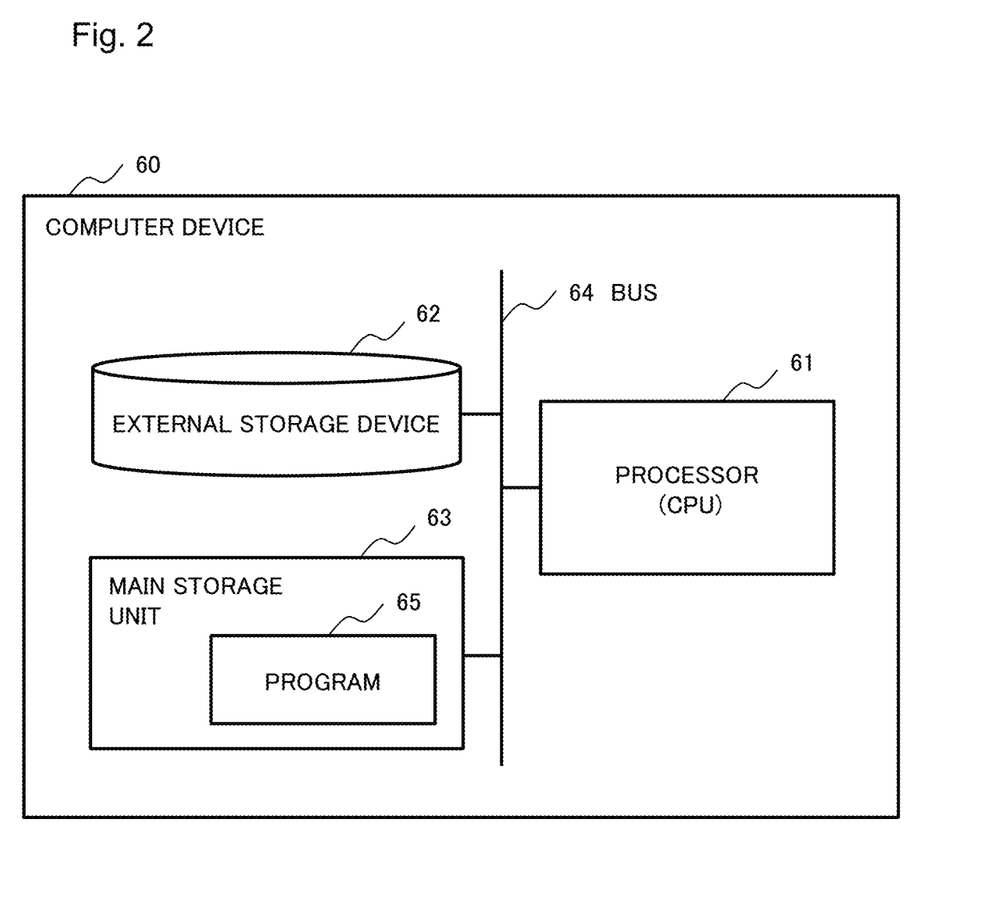
FIG. 2 is a configuration diagram of a computer device 60.

The disk control device 10 may be realized as a computer device. FIG. 2 is a configuration diagram of one example of a computer device 60 which realizes the disk control device 10 shown in FIG. 1. The computer device 60 includes at least one processor 61 (CPU), a main storage unit 63, and an external storage device 62 that are mutually connected to each other via a bus 64. The processor 61 reads/writes the data from/in the main storage unit 63 and the external storage device 62 via the bus 64.

The processor 61 executes a program 65 stored in the main storage unit 63. Further, the program 65 may be stored in the external storage device 62 in advance and at the time of initial setting of the computer device 60, the processor 61 may load the program 65 to the main storage unit 63 from the external storage device 62.

The main storage unit 63 is a semiconductor memory device. The external storage device 62 is a storage device such as a HDD, a SSD, or the like. For example, the main storage unit 63 functions as the cache 24 shown in FIG. 1.

The processor 61 of the disk control device 10 functions as the SAN control unit 21 (including the internal element other than the cache 24) by executing the program 65. Namely, the processor 61 performs a process, which is a process to be performed by the SAN control unit 21 (including the internal element other than the cache 24), by executing the program 65.

The external storage device 62 may store the characteristic value. The external storage device 62 may be used as a storage area of the input-output execution virtual machine 30.

Further, the program 65 shown in FIG. 2 may be firmware stored in a ROM (Read Only Memory) (not shown). Namely, the SAN control unit 21 (including internal elements other than the cache 24) may be realized by firmware.

Operation

1) Measurement of the Characteristic Value

When the disk control device 10 is activated, the input-output requests to all the logical disks 51 are transferred to the control virtual machine 20. These input-output requests are performed by the input-output unit 22 of the control virtual machine 20. In the course of this process, the characteristic value of the logical disk 51 mentioned above is measured by the cache access measurement unit 25.

Once the cache access measurement unit 25 acquires a statistically sufficient number of samples of the characteristic value, the cache access measurement unit 25 notifies the distribution determination unit 26 of the completion of acquisition. The distribution determination unit 26 performs selection of the input-output execution virtual machine 30 to be activated and determination of the amount of resources to be allocated to the activated input-output execution virtual machine 30 on the basis of the characteristic value of each logical disk 51. The distribution determination unit 26 may select the input-output execution virtual machine 30 to be activated and determine the amount of resources to be allocated to the activated input-output execution virtual machine 30 at a time point at which a predetermined time elapses after the disk control device 10 is activated.

First, the distribution determination unit 26 performs determination of whether or not distribution of resources is required. Namely, the distribution determination unit 26 determines whether or not the logical disk 51 of which a probability of occurrence of input queue of the data from the cache 24 is equal to or greater than a predetermined value exists. When the logical disk 51 of which the probability of occurrence of input queue is equal to or greater than the predetermined value exists, the distribution determination unit 26 determines that distribution of resources to the input-output execution virtual machine 30 is required. Subsequently, the distribution determination unit 26 selects the input-output execution virtual machine 30 to be activated and determines the amount of resource to be allocated to the input-output execution virtual machine 30 to be activated.

Figure 3:
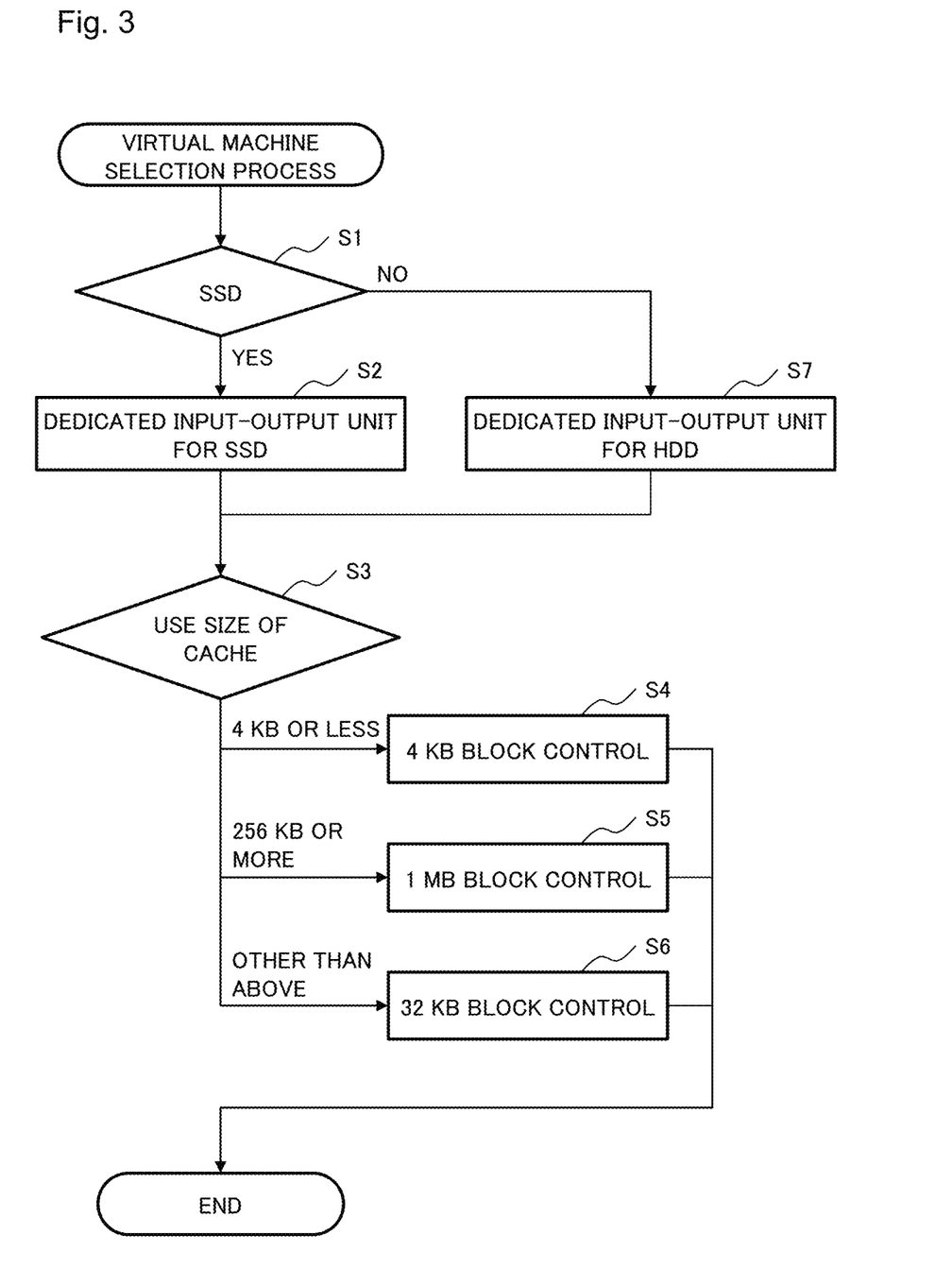
FIG. 3 is a flowchart of a process for selecting an input-output execution virtual machine 30 to be activated.

2) Selection of the Input-Output Execution Virtual Machine 30 to Be Activated FIG. 3 is a flowchart of a process for selecting the input-output execution virtual machine 30 to be activated. The distribution determination unit 26 performs the processes shown in FIGS. 3 to 5 for each of the logical disks 51.

When the disk device 50 constituting the logical disk 51 currently performing a process is a SSD (YES in step S1), the distribution determination unit 26 selects a group of the input-output execution virtual machines 30 including the input-output unit 22 dedicated to input-output of the SSD as a candidate for the input-output execution virtual machine 30 to be activated (S2). On the other hand, when the disk device 50 constituting the logical disk 51 currently performing a process is a HDD (NO in step S1), the distribution determination unit 26 selects a group of the input-output execution virtual machines 30 including the input-output unit 22 dedicated to input-output of the HDD as a candidate for the input-output execution virtual machine 30 (S7). For example, the input-output unit 22 dedicated to input-output of the HDD performs a seek operation of the HDD on the basis of an elevator algorithm as well as storing data to the HDD and controlling sorting of the data based on the address order.

Next, the distribution determination unit 26 refers to the characteristic value indicating the use size (that is the memory amount of the cache 24 that is occupied by the logical disk 51) of the cache 24 that is used by the logical disk 51 (S3) and selects the input-output execution virtual machine 30 of which the size of the cache 24 is minimum among the input-output execution virtual machines 30 including the cache 24 whose size exceeds the use size (steps S4 to S6). Here, as the use size of the cache 24, for example, when a deviation value is less than a predetermined threshold value, the average may be adopted and when a deviation value is greater than a predetermined threshold value, the mode value may be adopted.

3) Determination of the Allocated Memory Amount

Figure 4:
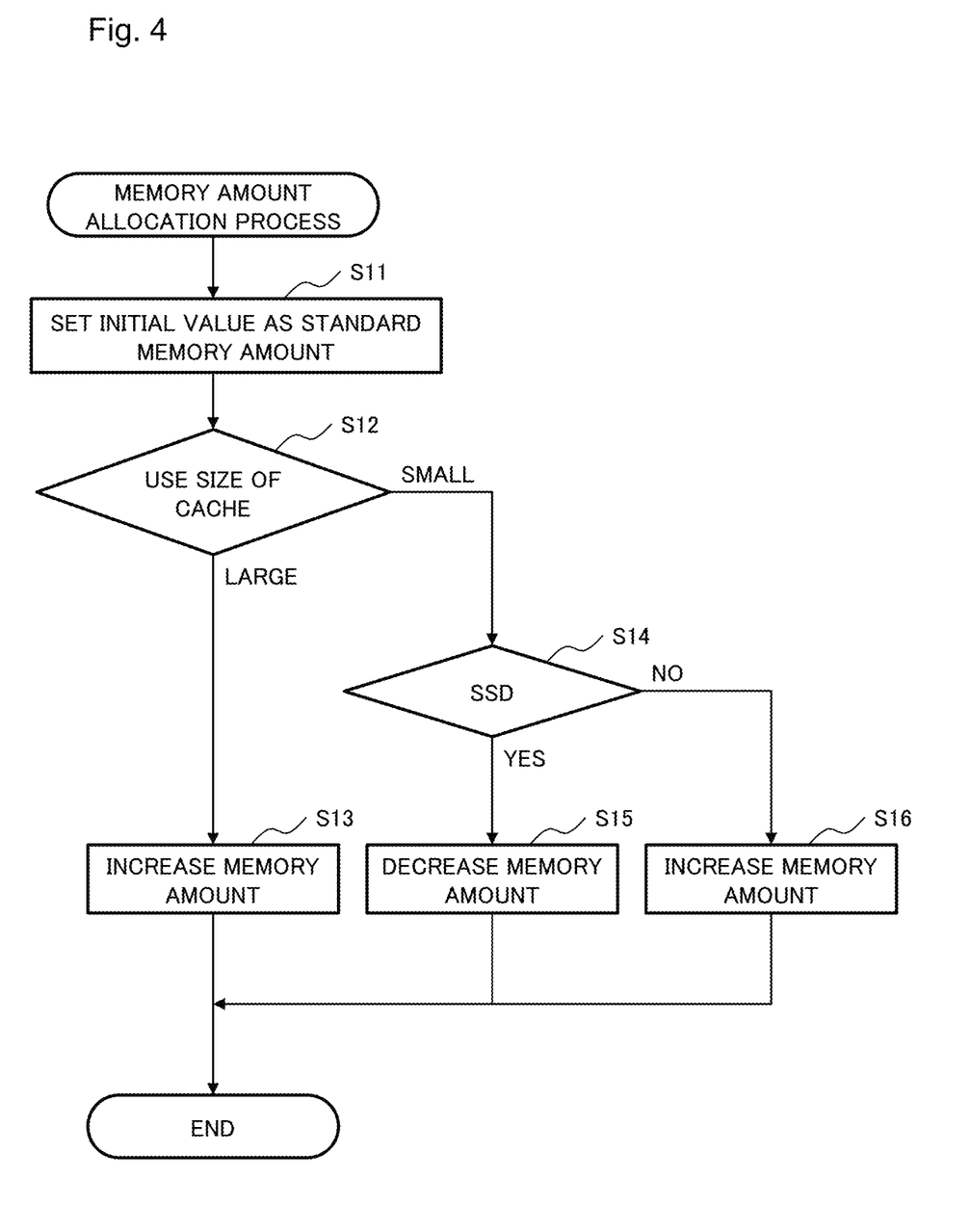
FIG. 4 is a flowchart of a memory amount allocation process performed to an activated input-output execution virtual machine 30.

FIG. 4 is a flowchart of a memory amount allocation process performed to the activated input-output execution virtual machine 30.

The distribution determination unit 26 sets an initial value of the memory amount allocated to the input-output execution virtual machine 30 as a predetermined standard memory amount (S11). When the use size of the cache 24 that is used by the logical disk 51 that currently performs a process is larger than the predetermined threshold value ("Large" in step S12), the distribution determination unit 26 determines that a writing speed to the logical disk 51 becomes a bottleneck and increases the memory amount allocated to the input-output execution virtual machine 30 (S13). The distribution determination unit 26 may use a constant value or a value according to a difference from the predetermined threshold value as an increment of the memory amount.

In a case in which the use size of the cache 24 is smaller ("Small" in step S12) and the logical disk 51 is composed of the HDD (NO in step S14), the distribution determination unit 26 determines that it is better to perform data read/write control to the logical disk 51 after the data is stored in the cache 24 and increases the memory amount allocated to the input-output execution virtual machine 30 (S16). In a case in which the logical disk 51 is composed of the SSD (YES in step S14), the distribution determination unit 26 determines that a large amount of memory is unnecessary by taking advantage of high speed performance of the SSD and decreases the memory amount allocated to the input-output execution virtual machine 30 (S16).

4) Determination of the Number of Allocated CPUs

Figure 5:
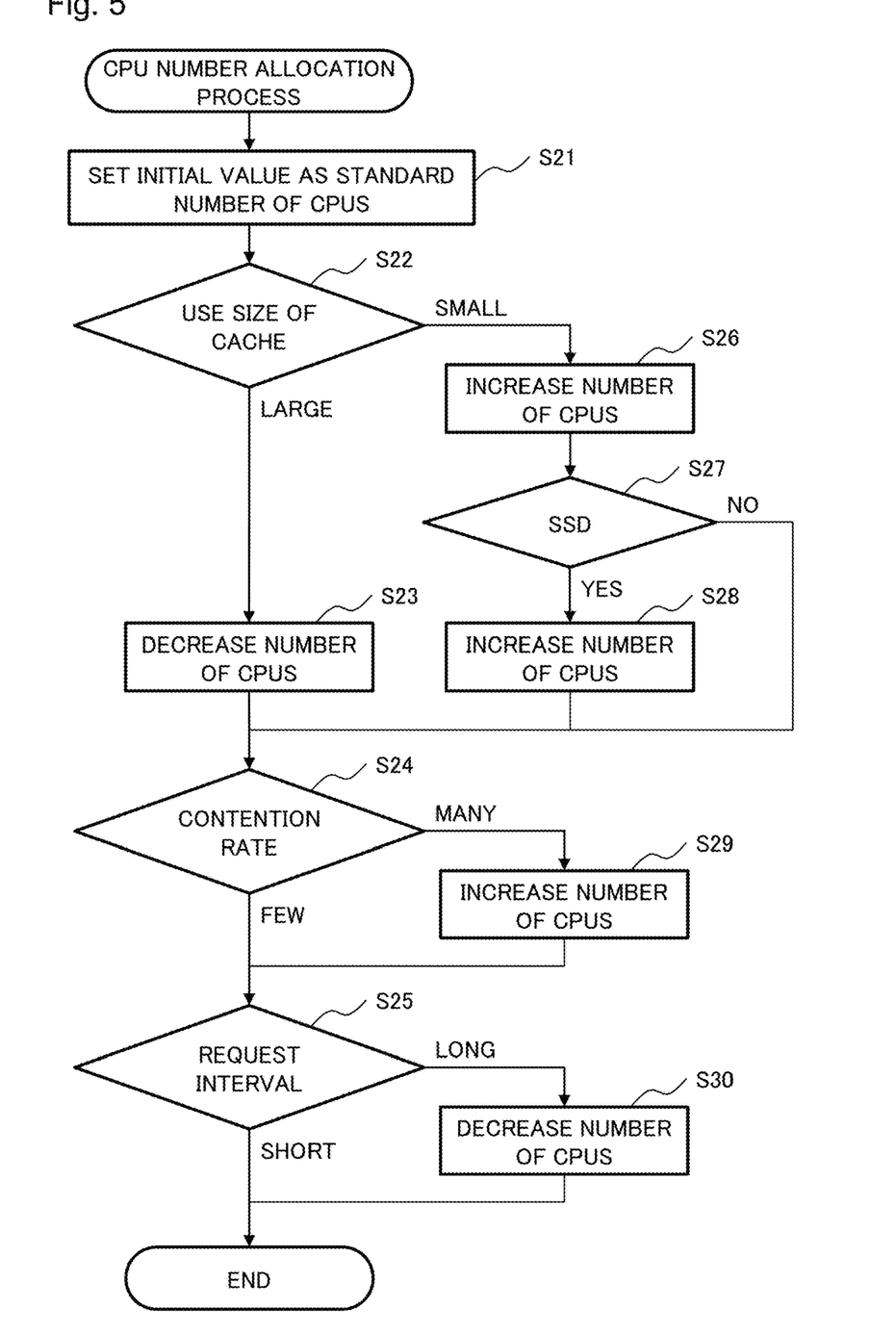
FIG. 5 is a flowchart of a CPU allocation process performed to an activated input-output execution virtual machine 30.

FIG. 5 is a flowchart of a CPU allocation process performed to the input-output execution virtual machine 30.

The distribution determination unit 26 sets an initial value of the number of CPUs allocated to the input-output execution virtual machine 30 as a predetermined standard number of CPUs (S21). When the use size of the cache 24 that is used by the logical disk 51 that currently performs a process is larger than the predetermined threshold value ("Large" in step S22), the distribution determination unit 26 determines that the logical disk 51 becomes a bottleneck (HDD/SSD neck) and that the number of allocated CPUs does not become a bottleneck (no CPU neck) and decreases the number of CPUs allocated to the input-output execution virtual machine 30 (S23). When the use size of the cache 24 is smaller ("Small" in step S22), the distribution determination unit 26 determines that the number of executions of the input-output process is to increase and adds the number of CPUs allocated to the input-output execution virtual machine 30 (S26). Further, in a case in which the logical disk 51 is composed of the SSD (YES in step S27), the distribution determination unit 26 determines that by operating more SSDs, the process can be efficiently performed and further increases the number of CPUs allocated to the input-output execution virtual machine 30 (S28).

Next, the distribution determination unit 26 performs a process for determining a use contention rate of the cache 24. When the use contention rate of the cache 24 is higher ("Many" in step S24), the distribution determination unit 26 determines that the logical disk 51 currently performing a process is under heavy load and increases the number of CPUs allocated to the input-output execution virtual machine 30 (S29).

When it takes a long time until the next input-output request arrives, in other words, when an input-output request arrival interval is longer ("Long" in step S25), the distribution determination unit 26 determines that a high speed response to the upper stream device is not required and decreases the number of CPUs allocated to the input-output execution virtual machine 30 (S30).

Further, the number of the CPUs to be increased or decreased may be 10% of the total number of the CPUs installed in the disk control device 10.

5) Activation of the Input-Output Execution Virtual Machine 30

The distribution determination unit 26 notifies the virtual infrastructure control unit 12 of the selected input-output execution virtual machine 30 and the determined resource amount to be allocated via the infrastructure parameter notification unit 29. For example, the virtual infrastructure control unit 12 selects a model of a configuration of the input-output execution virtual machine 30 and corrects the allocated resource amount according to the information in the notification. The virtual machine execution unit 13 creates the input-output execution virtual machine 30 on the basis of the given configuration information and activates it. The activated input-output execution virtual machine 30 loads the designated guest OS 27 and the SAN control unit 21 (only the input-output unit 22 may be loaded without loading the whole thing) and executes them.

6) Switching of an Input-Output Request Forwarding Destination

When a state in which the input-output request can be received is brought about, the input-output unit 22 of the input-output execution virtual machine 30 notifies the virtual infrastructure control unit 12 that a path switch is available via the path switch management unit 28. The virtual infrastructure control unit 12 which is notified that a "path switch is available informs the guest OS 27 of the control virtual machine 20 that a path switch preparation has completed.

When the path switch management unit 28 of the guest OS 27 of the control virtual machine 20 receives a preparation completion notification, the path switch management unit 28 instructs the input-output unit 22 to turn off the cache 24. By this instruction, the input-output unit 22 sweeps out remaining caching information of the control virtual machine 20 and puts the subsequent input and output into a non-caching state. By this process, the operation of the control virtual machine 20 is limited and whereby, a use amount of CPU used by the control virtual machine 20 can be reduced.

After the input-output unit 22 of the control virtual machine 20 puts the cache 24 into an OFF state, the input-output unit 22 issues a path switching execution instruction to the virtual infrastructure control unit 12 via the path switch management unit 28. Receiving the path switching execution instruction, the virtual infrastructure control unit 12 switches the input-output request forwarding destination related to the subsequent input-output request to the logical disk 51 from the input-output control virtual machine 20 to the activated input-output execution virtual machine 30.

Note that a control method of the input-output unit 22 is not limited to the example mentioned above. The control method of the input-output unit 22 may include a method of controlling an element other than the disk type and the memory block of the cache 24. Further, the forwarding destination of the input-output request may be switched for each logical disk 51 or the forwarding destination of the input-output request may be switched for each logical address range of the logical disk 51.

By such system, in the input-output process, an appropriate and economical resource allocation and efficient control can be performed. Further, an uneven occupancy of resources by a certain logical disk 51 can be prevented and a total amount of input-output processing of the whole disk control system 40 can be increased while keeping a proper balance.

Explanation of Operation of a Specific Example

Figure 6:
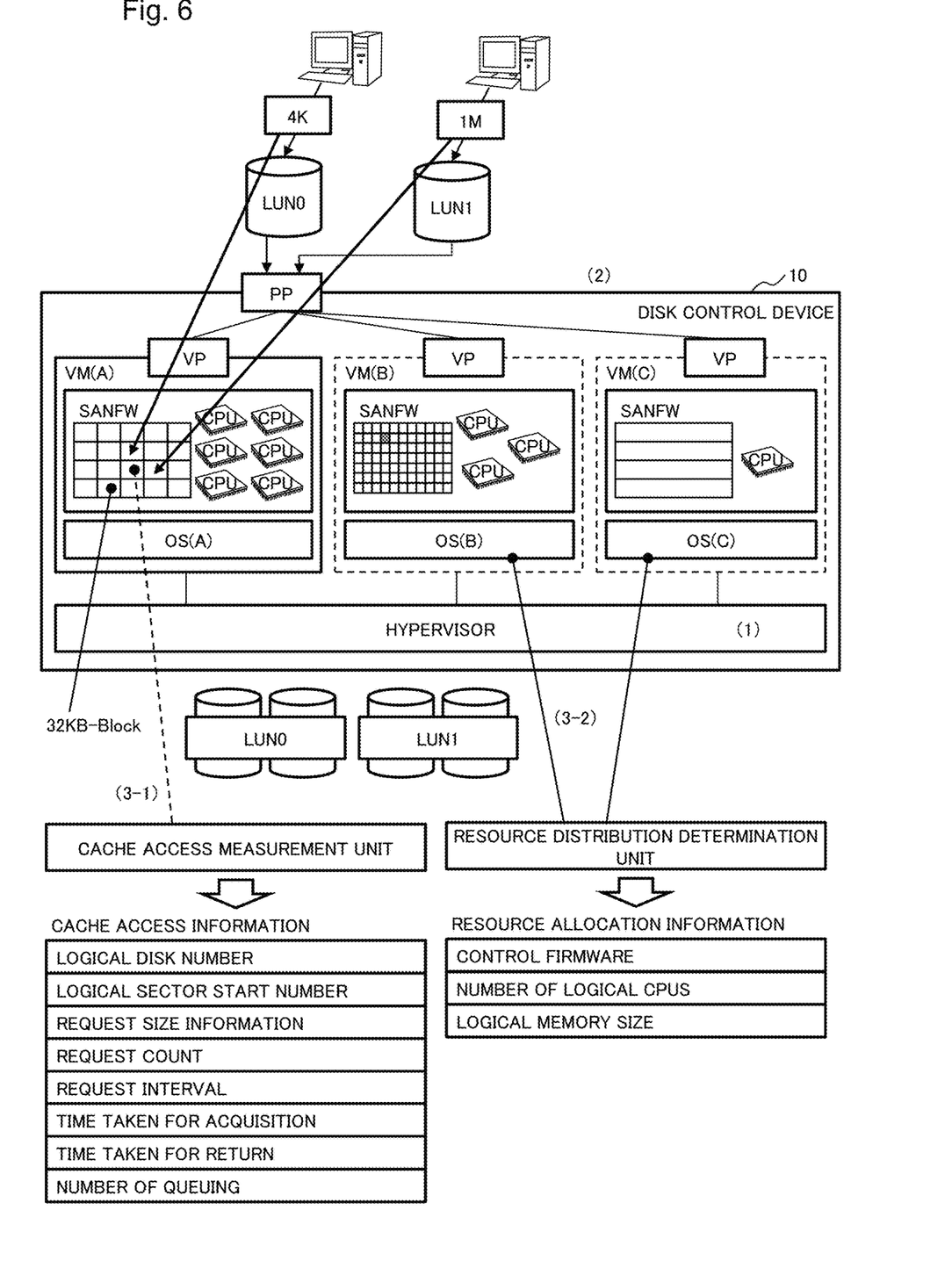
FIG. 6 is a figure (part 1) for explaining a specific configuration and an example of operation of a disk control system 40 according to a first example embodiment.
Figure 7:
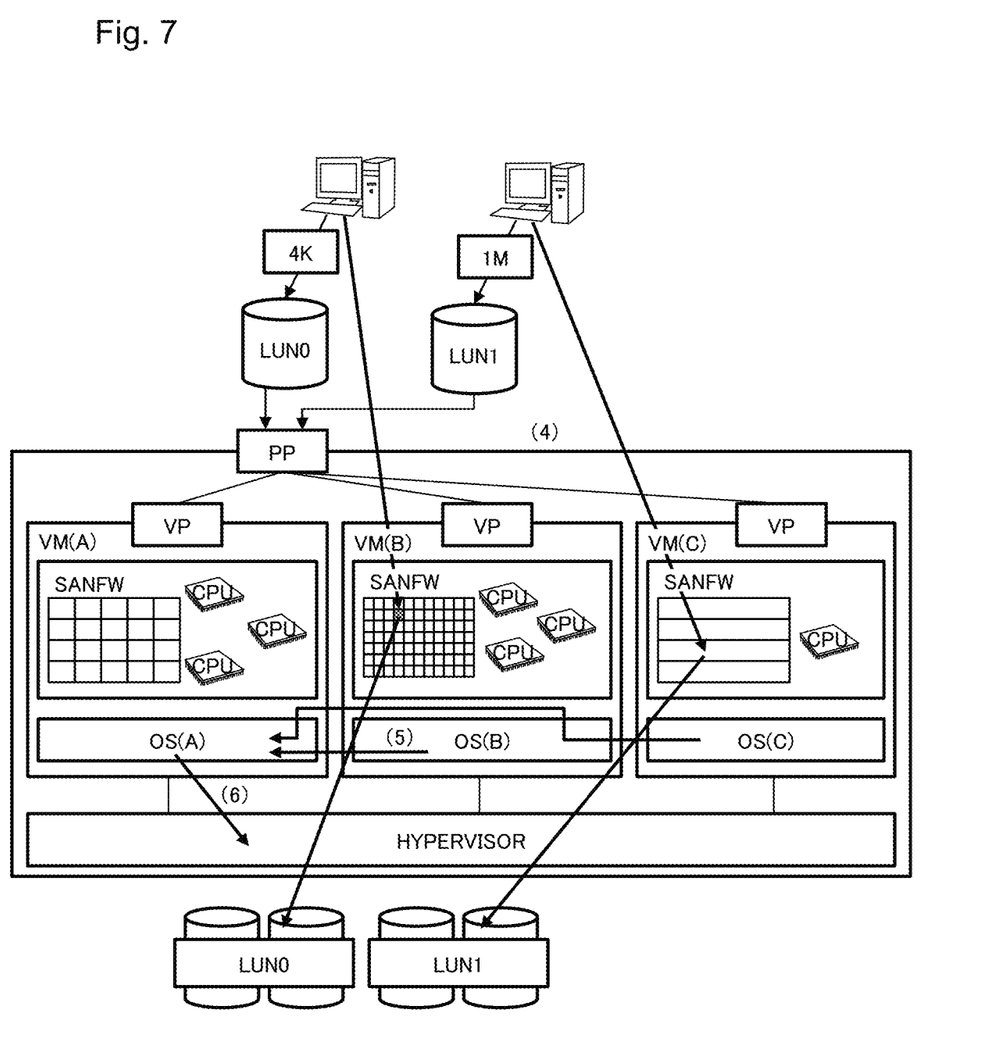
FIG. 7 is a figure (part 2) for explaining a specific configuration and an example of operation of a disk control system 40 according to a first example embodiment.

FIGS. 6 and 7 are figures for explaining a specific configuration and an example of operation of the disk control system 40 according to the first example embodiment.

As shown in FIG. 6, the disk control device 10 includes a virtualized infrastructure ((1) in FIG. 6)).

An OS (A) of a control virtual machine 20 (VM(A)) in which firmware (SANFW) for performing an analysis of the characteristic value operates and an OS (B)/an OS (C)/ . . . of the execution virtual machines 30 in which firmware suitable for the characteristic of an application are prepared. The OS (A) causes firmware which operates in a 32 KB memory block to operate, and the OS (B) causes firmware specialized for random write which operates in a 4 KB memory block to operate. The OS (C) causes firmware specialized for storage of data in a 1 MB memory block, sorting, and disk access to operate ((2) in FIG. 6).

At an initial stage, the disk control device 10 allocates all the CPUs and all the memories, activates one control virtual machine 20 (VM(A)) in which the OS (A) is loaded, and performs input-output process to all the logical disks 51. In the logical disk 51 (LUN0) of the logical unit number 0, writing whose size is small with an average of about 4 KB is done at high load, and the logical disk 51 (LUN0) is accessed at random over a wide range. On the other hand, in the logical disk 51 (LUN1) of the logical unit number 1, writing whose size is large with an average of about 1 MB is done at middle load, and the logical disk 51 (LUN1) is accessed to a sequential address.

Using the cache 24, the cache access measurement unit 25 of the control virtual machine 20 (VM(A)) accumulates information such as a request logical disk number/a start sector number/size information/the number of requests/request interval information/the number of queues, and the like ((3-1) in FIG. 6).

The following situation can be found from a result of this accumulation.

a) About the Logical Disk (LUN0)
   The position of the start sector number is not fixed within the 32 KB memory block. Namely, data is inputted to or is outputted from the logical disk (LUN0) in a unit smaller than 32 KB.
   Because the cache size requested is small, the cache 24 has been obtained within short queuing time despite of high contention number.
   The number of requests is greater than that of the logical disk (LUN1).

b) About the Logical Disk (LUN1)
   A head of the 32 KB memory block coincides with the start sector number.
   Because the use size to the cache 24 is large, it takes much time to obtain the cache 24.
   Many memory blocks are used.

The distribution determination unit 26 of the control virtual machine 20 (VM(A)) determines that resource distribution is required on the basis of these information. Further, the distribution determination unit 26 causes an input-output execution virtual machine 30 (VM(B)) having the OS (B) installed therein to process the input-output request of the logical disk (LUN0). On the other hand, the distribution determination unit 26 determines that an input-output execution virtual machine 30 (VM(C)) having the OS (C) installed therein is made to process the input-output request of the logical disk (LUN1). Next, the distribution determination unit 26 of the control virtual machine 20 (VM(A)) generates an infrastructure parameter of which the number of memories is small and the number of CPUs is large to the input-output execution virtual machine 30 (VM(B)). On the other hand, the distribution determination unit 26 generates an infrastructure parameter of which the number of memories is large and the number of CPUs is small to the input-output execution virtual machine 30 (VM(C)). The distribution determination unit 26 notifies the virtual infrastructure control unit 12 of the created parameter ((3-2) in FIG. 6).

The virtual infrastructure control unit 12 completes structure definition information of the input-output execution virtual machines (VM(B) and VM(C)) on the basis of the given infrastructure parameter. The virtual machine execution unit 13 activates the input-output execution virtual machines (VM(B) and VM(C)) according to the structure definition information and allocates the resource to each of the input-output execution virtual machines (VM(B) and VM(C)). The OS (B) and the OS (C) start operations on the activated input-output execution virtual machines (VM(B) and VM(C)), respectively ((4) of FIG. 7).

The firmware also starts the operation on the OS (B) and the OS (C). The input-output unit 22 of the firmware of the input-output execution virtual machines 30 (VM(B) and VM(C)) notifies the control virtual machine 20 (VM(A)) that the forwarding destination of the input-output request can be switched ((5) of FIG. 7).

The input-output unit 22 of the firmware of the control virtual machine 20 (VM(A)), when informed that switching is available, turns off the cache 24 used in the logical disks (LUN0 and LUN1), thereby reduces a CPU use amount, and outputs an input-output request switching instruction to the virtual infrastructure control unit 12 ((6) of FIG. 7).

The virtual infrastructure control unit 12 that received the instruction from the control virtual machine 20 (VM(A)) switches the forwarding destination of the input-output request from the logical disks (LUN0 and LUN1) to the input-output execution virtual machine 30 (VM(B)) and/or the input-output execution virtual machine 30 (VM(C)) ((7) of FIG. 7).

In a case in which a load status varies depending on time zone (for example, an operation in which only an overnight backup operation is performed or the like), the disk control device 10 may stop some input-output execution virtual machines 30 and operate the OS (B) and the OS (C) by a small number of memories and CPUs.

Effect

The disk control device 10 according to the first example embodiment enables to suppress the input-output control in accordance with a characteristic of a certain logical disk 51 from affecting another process. For example, the disk control device 10 can suppress degradation of performance of another logical disk 51. This is because the input-output execution virtual machine 30 suitable for the characteristic value is selected among the plurality of the input-output execution virtual machines 30 on the basis of the characteristic value of the logical disk 51 relating to the use of the cache 24 and activated, and the activated input-output execution virtual machine 30 is made to perform input and output of data to the logical disk 51.

A second effect is that an efficient use of the resources becomes possible. Namely, the disk control device 10 can suppress the excessive use of CPU and efficiently operate all the logical disks 51. This is because one input-output execution virtual machine 30 is activated on the basis of the characteristic value of the logical disk 51 relating to the use of the cache 24, and a suitable amount of resources is allocated to the activated input-output execution virtual machine 30.

Further, the following effects can be obtained.

1) Because the input-output request to the logical disk 51 is allocated to the input-output execution virtual machine 30 suitable for a load pattern of the logical disk 51, the cache 24 can be efficiently used. Therefore, a hit rate, response performance, and throughput could be improved.

2) Having various control methods that are suitable for the logical disks 51 for various use, the input-output unit 22 can perform an operation suitable for an operation method in a required time zone.

3) Appropriate resource allocation can be easily performed by only performing analysis of an access pattern to the cache 24.

Second Example Embodiment

Figure 8:
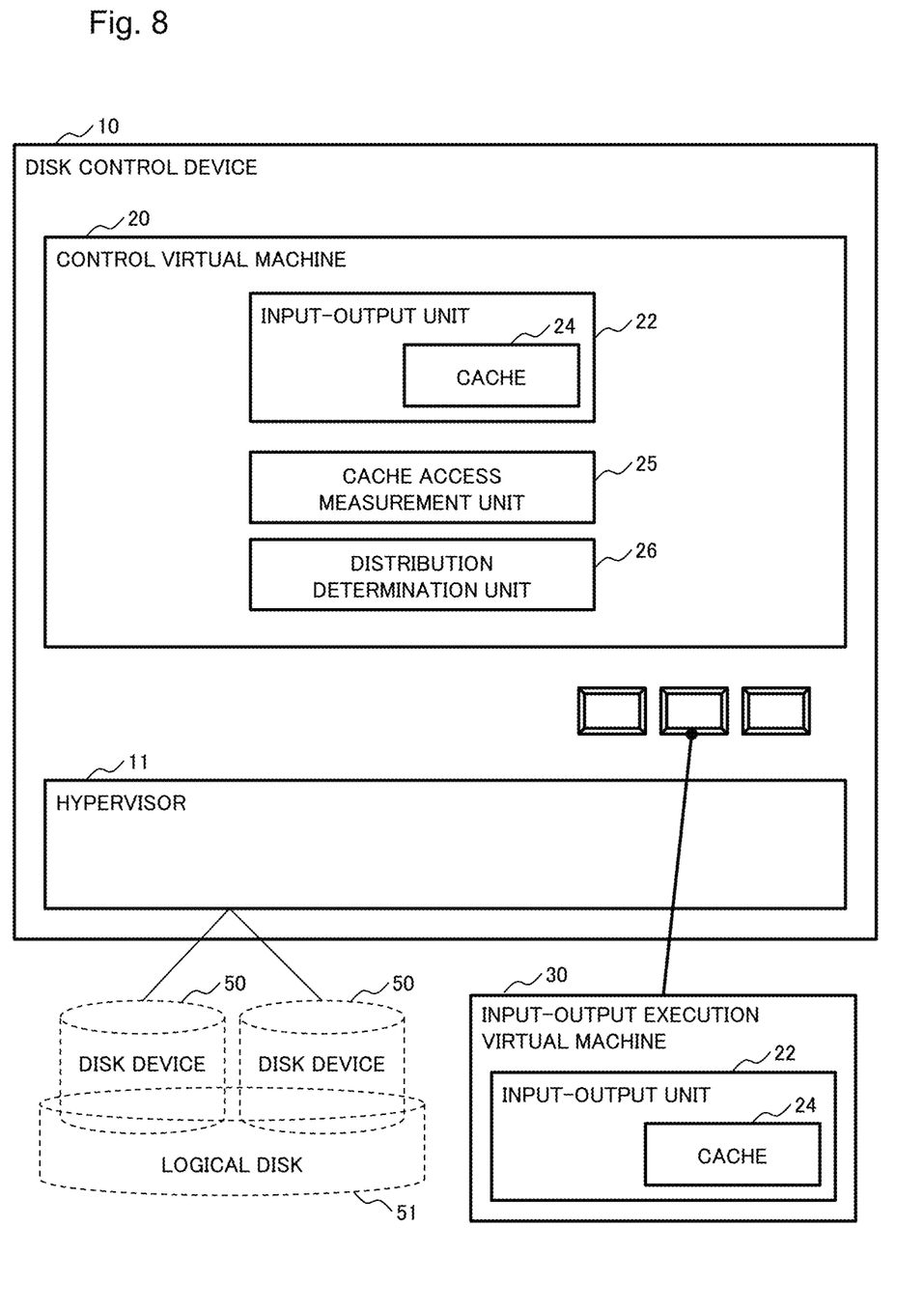
FIG. 8 is a figure illustrating a configuration of a disk control device 10 according to a second example embodiment of the present invention.

FIG. 8 shows a configuration of the disk control device 10 according to a second example embodiment of the present invention.

As shown in FIG. 8, the disk control device 10 according to this example embodiment is connected to the disk device 50 which realizes the logical disk 51. Further, the disk control device 10 includes the control virtual machine 20, a plurality of the input-output execution virtual machines 30, and the hypervisor 11.

The control virtual machine 20 includes the input-output unit 22. The input-output unit 22 includes the cache 24 and inputs/outputs the data stored in the cache 24 to/from the logical disk 51. Further, the control virtual machine 20 includes the cache access measurement unit 25 that measures the characteristic value of the logical disk 51 and the distribution determination unit 26 that selects one of the plurality of the input-output execution virtual machines 30 on the basis of the characteristic value and notifies the hypervisor 11 of the selected input-output execution virtual machine 30.

Each of the plurality of the input-output execution virtual machines 30 includes the input-output unit 22, and each of the input-output units 22 performs input and output by using a control method different from each other. The hypervisor 11 activates the input-output execution virtual machine 30 of which the hypervisor 11 is notified by the distribution determination unit 26 and switches the destination of the input-output request to the logical disk 51 from the control virtual machine 20 to the activated input-output execution virtual machine 30.

In this example embodiment, unlike the first example embodiment, the input-output unit 22, the cache access measurement unit 25, and the distribution determination unit 26 are not installed in one unit such as the SAN control unit 21. The input-output unit 22, the cache access measurement unit 25, and the distribution determination unit 26 may be installed as an independent unit. In this case, the input-output execution virtual machine 30 at least includes the input-output unit 22.

The distribution determination unit 26 may directly communicate with the hypervisor 11 by using an interrupt by an illegal command of a processor or the like without passing through the guest OS 27.

In this example embodiment, a standard memory amount and a standard number of CPUs may be allocated to the input-output execution virtual machine 30 and the input-output execution virtual machine 30 may be activated.

The disk control device 10 according to the second example embodiment suppresses the input-output control in accordance with a characteristic of a certain logical disk 51 to affect another process. For example, the deterioration of the performance of another logical disk 51 can be suppressed. This is because the distribution determination unit 26 selects one of the plurality of the input-output execution virtual machines 30 that is suitable for the characteristic value of the logical disk 51, activates it, and makes it perform input and output of the logical disk 51.

The invention of the present application has been described above with reference to the example embodiment. However, the invention of the present application is not limited to the above mentioned example embodiment. Various changes in the configuration or details of the invention of the present application that can be understood by those skilled in the art can be made without departing from the scope of the invention of the present application. The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents. Further, it is noted that the inventor's intent is to retain all equivalents of the claimed invention even if the claims are amended during prosecution.

REFERENCE SIGNS LIST 10 disk control device
11 hypervisor
12 virtual infrastructure control unit
13 virtual machine execution unit
1A physical port
20 control virtual machine
21 SAN control unit
22 input-output unit
23 execution unit
24 cache
25 cache access measurement unit
26 distribution determination unit
27 guest OS
28 path switch management unit
29 infrastructure parameter notification unit
2A virtual port
30 input-output execution virtual machine
40 disk control system
50 disk device
51 logical disk
60 computer device
61 processor
62 external storage device
63 main storage unit
64 bus
65 program

The invention claimed is:

1. A disk control device comprising:
a plurality of virtual computers; and
a virtual computer controller;
wherein the virtual computer controller is connected to a logical disk realized on a disk device;
wherein the virtual computer includes:
input-output unit including a cache memory that inputs and outputs data to and from the logical disk;
cache access measurement unit for measuring a characteristic value of the logical disk by analyzing an access pattern to the logical disk by the cache memory; and
distribution determination unit for determining an amount of resources to be allocated to one of the plurality of virtual computers based on the characteristic value, the one of the plurality of the virtual computers being an input-output execution virtual computer, and notifying the virtual computer controller thereof; and
wherein the virtual computer controller:
allocates resources to the input-output execution virtual computer and activates the input-output execution virtual computer, an amount of the resources and the virtual computer controller being notified; and
when the virtual computer controller receives an input-output request to the logical disk, transfers the input-output request to the input-output execution virtual computer;
wherein the characteristic value measured by the cache access measurement unit includes at least an amount of the cache memory used by the logical disk and an index value for determining whether or not the disk device which realizes the logical disk is a magnetic disk device; and
wherein the distribution determination unit:
a) allocates a memory whose capacity is larger than a first standard amount and a CPU resource whose amount is smaller than a second standard amount to the input-output execution virtual computer when the amount of the cache memory is larger than a predetermined value;
b) allocates a memory whose capacity is larger than the first standard amount and a CPU resource whose amount is larger than the second standard amount to the input-output execution virtual computer when the amount of the cache memory is smaller than the predetermined value and the index value indicates that the disk device which realizes the logical disk is a magnetic disk device; and c) allocates a memory whose capacity is smaller than the first standard amount and a CPU resource whose amount is larger than the second standard amount to the input-output execution virtual computer when the amount of the cache memory is smaller than the predetermined value and the index value indicates that the disk device which realizes the logical disk is not a magnetic disk device.

2. The disk control device described in claim 1, wherein the cache access measurement unit measures the characteristic value for each of a plurality of logical disks realized on a disk device.

3. The disk control device described in claim 1, wherein the characteristic value measured by the cache access measurement unit includes at least a size of the cache memory used by the logical disk;
the plurality of virtual computers each input and output data to and from the logical disk by using a control method different for each virtual computer;
the control method of the virtual computer specifies at least a size of one block of the cache memory; and
the distribution determination unit determines an amount of resources to be allocated to the input-output execution virtual computer, the virtual computer including the cache memory of which the size of one block is minimum among the cache memories each having a capacity that is equal to or larger than a capacity to be used by the logical disk.

4. The disk control device described in claim 1, wherein the characteristic value measured by the cache access measurement unit includes at least a determination value indicating whether or not the disk device which realizes the logical disk is a magnetic disk device; and
the distribution determination unit determines an amount of resources to be allocated to the input-output execution virtual computer, the virtual computer capable of accumulating data in the logical disk so as to be able to access the data in address order when the disk device which realizes the logical disk is the magnetic disk device.

5. The disk control device described in claim 1, wherein the characteristic value measured by the cache access measurement unit includes at least an interval at which the virtual computer controller receive the input-output request; and
when the interval is longer than a predetermined time, the distribution determination unit allocates a smaller amount of CPU resources in comparison with the amount of CPU resources allocated when the interval is shorter than the predetermined time.

6. The disk control device described in claim 1, wherein after the input-output unit of the virtual computer performs writing of data of the cache memory to the logical disk and releasing or disabling of the cache memory, the input-output unit instructs the virtual computer controller to switch a forwarding destination of the input-output request to the input-output execution virtual computer; and
the virtual computer controller switches the forwarding destination of the input-output request to the input-output execution virtual computer according to the instruction from the input-output unit.

7. A method for controlling operation of a disk control device, the disk control device including a plurality of virtual computers and virtual computer controller, the virtual computer controller being connected to a logical disk realized on a disk device,
the method comprising:
measuring a characteristic value of the logical disk by analyzing an access pattern to the logical disk by a cache memory of the virtual computer;
determining an amount of resources to be allocated to one of the plurality of virtual computers based on the characteristic value, the one of the plurality of the virtual computers being an input-output execution virtual computer, and notifying the virtual computer controller thereof;
allocating resources to the input-output execution virtual computer and activates the input-output execution virtual computer, an amount of the resources and the virtual computer controller being notified;
setting a forwarding destination of an input-output request to the logical disk to the input-output execution virtual computer; and
when the virtual computer controller receive an input-output request to the logical disk, transferring the input-output request to the input-output execution virtual computer;
wherein the characteristic value measured by the cache access measurement unit includes at least an amount of the cache memory used by the logical disk and an index value for determining whether or not the disk device which realizes the logical disk is a magnetic disk device; and
wherein the method further includes:
a) allocating a memory whose capacity is larger than a first standard amount and a CPU resource whose amount is smaller than a second standard amount to the input-output execution virtual computer when the amount of the cache memory is larger than a predetermined value;
b) allocating a memory whose capacity is larger than the first standard amount and a CPU resource whose amount is larger than the second standard amount to the input-output execution virtual computer when the amount of the cache memory is smaller than the predetermined value and the index value indicates that the disk device which realizes the logical disk is a magnetic disk device; and
c) allocating a memory whose capacity is smaller than the first standard amount and a CPU resource whose amount is larger than the second standard amount to the input-output execution virtual computer when the amount of the cache memory is smaller than the predetermined value and the index value indicates that the disk device which realizes the logical disk is not a magnetic disk device.

8. A non-transitory recording medium recorded therein a program for controlling operation of a disk control device by a computer, wherein
the disk control device includes a plurality of virtual computers and virtual computer controller, the virtual computer controller is connected to a logical disk realized on the disk device;
the program causes the computer to:
measure a characteristic value of the logical disk by analyzing an access pattern to the logical disk by a cache memory of the virtual computer;

determine an amount of resources to be allocated to one of the plurality of virtual computers based on the characteristic value, the one of the plurality of the virtual computers being an input-output execution virtual computer, and notifying the virtual computer controller thereof;

allocate resources to the input-output execution virtual computer and activates the input-output execution virtual computer, an amount of the resources and the virtual computer controller being notified; and when the virtual computer controller receives an input-output request to the logical disk, transfer the input-output request to the logical disk to the input-output execution virtual computer;

wherein the characteristic value measured by the cache access measurement unit includes at least an amount of the cache memory used by the logical disk and an index value for determining whether or not the disk device which realizes the logical disk is a magnetic disk device; and wherein the program further causes the computer to:
a) allocate a memory whose capacity is larger than a first standard amount and a CPU resource whose amount is smaller than a second standard amount to the input-output execution virtual computer when the amount of the cache memory is larger than a predetermined value;
b) allocate a memory whose capacity is larger than the first standard amount and a CPU resource whose amount is larger than the second standard amount to the input-output execution virtual computer when the amount of the cache memory is smaller than the predetermined value and the index value indicates that the disk device which realizes the logical disk is a magnetic disk device; and
c) allocate a memory whose capacity is smaller than the first standard amount and a CPU resource whose amount is larger than the second standard amount to the input-output execution virtual computer when the amount of the cache memory is smaller than the predetermined value and the index value indicates that the disk device which realizes the logical disk is not a magnetic disk device.

* * * * *